Jan. 16, 1923.
J. W. FLOWER.
PIPE TAPPING ATTACHMENT.
FILED MAR. 31, 1921.
1,442,261.
2 SHEETS—SHEET 2.
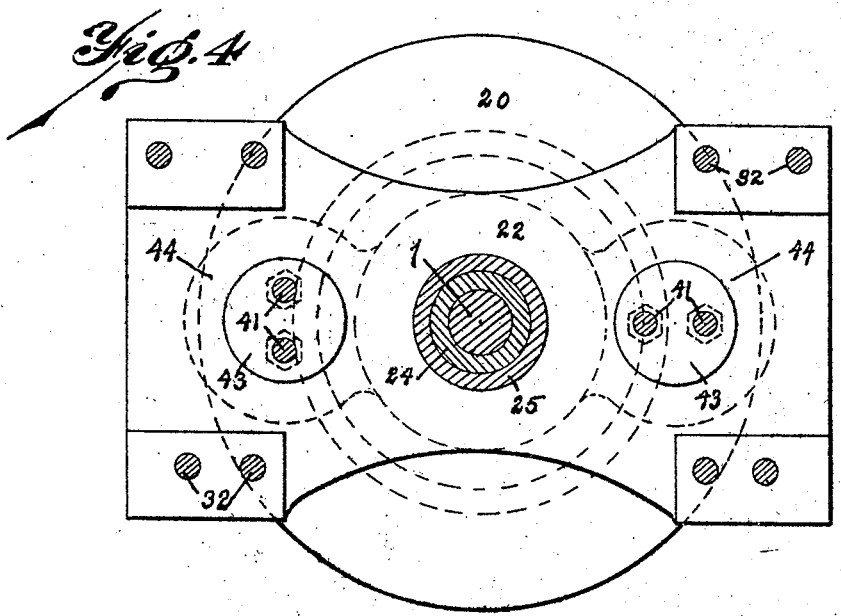
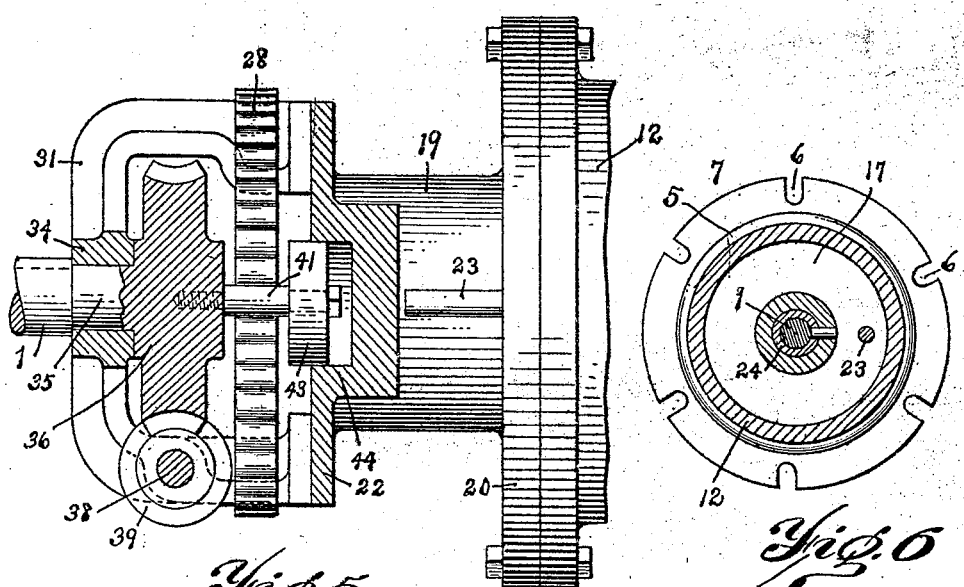
John W. Flower
INVENTOR.
BY
Edward N. Pagelsen
ATTORNEY.

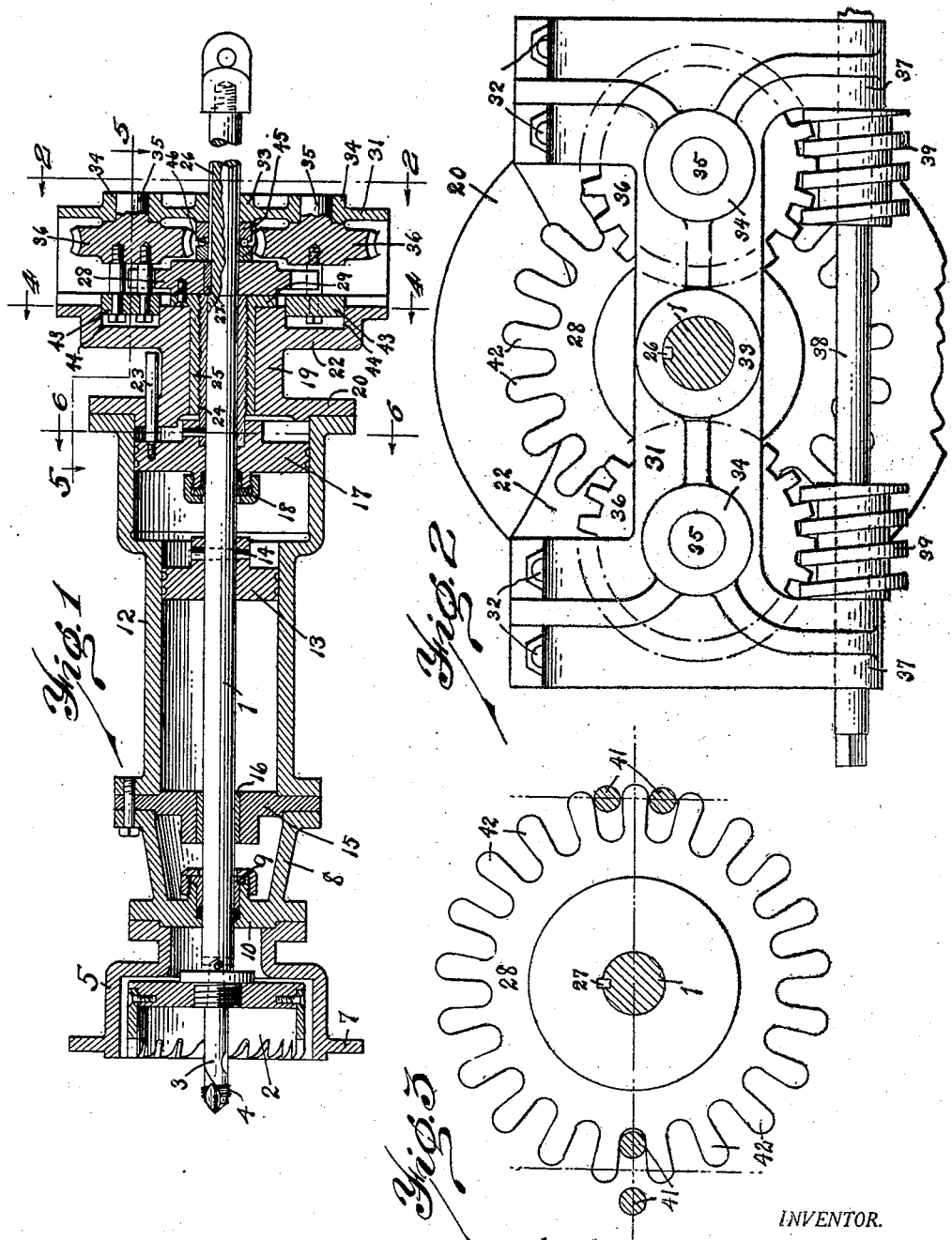

Patented Jan. 16, 1923.

1,442,261

UNITED STATES PATENT OFFICE.

JOHN W. FLOWER, OF DETROIT, MICHIGAN, ASSIGNOR TO HERBERT W. STANTON, OF DETROIT, MICHIGAN.

PIPE-TAPPING ATTACHMENT.

Application filed March 31, 1921. Serial No. 457,252.

*To all whom it may concern:*

Be it known that I, JOHN W. FLOWER, a citizen of the United States, and residing at Detroit, in the county of Wayne and State of Michigan, have invented a new and Improved Pipe-Tapping Attachment, of which the following is a specification.

This invention relates to means for cutting openings in water and gas street mains and other large pipes for the purpose of attaching branch pipes, and its object is to provide a device of this character which shall have great strength and wear resisting power and which shall have a self regulating feed so as to avoid breakage of the cutting tools.

The device shown in the accompanying drawing is adapted to be used in connection with the pipe connection shown in my Patent No. 1,278,128, dated September 10, 1918, and its purpose is to cut an opening into the pipe or tap the pipe as such work is usually called, in alinement with the valve 4 shown by this patent, the present device being attached to the outer flange of the valve before the valve is opened and the cutting tools being moved into engagement with the pipe and a hole cut in the pipe by said cutters, after which the cutters and the cut out portion of the pipe are withdrawn, the valve closed, the pipe cutter removed and a branch pipe is attached to the valve.

This invention consists in the details of construction illustrated in the accompanying drawing and particularly pointed out in the claims.

In the accompanying drawings, Fig. 1 is a central longitudinal section of my improved pipe perforating machine. Fig. 2 is a section on the line 2—2 of Fig. 1. Fig. 3 is an elevation of the main feed gear. Figs. 4, 5 and 6 are sections on the lines 4—4, 5—5 and 6—6 of Fig. 1, respectively.

Similar reference characters refer to like parts throughout the several views.

The central spindle 1 of this attachment has a cylindrical cutter 2 and a drill 3 of usual construction at its inner end, the drill being formed with spirals or threads in the usual manner. This spindle extends through the connecting hub 5 which is adapted to be secured to the outer flange of the valve body 4 shown in my above named prior patent by bolts inserted in the notches 6 in the flange 7. The hub 5 connects to the spool 8 which has a stuffing box 9 in its head 10 to prevent leakage around the spindle from the main being tapped.

The cylinder 12 is of two diameters and has a piston 13 in its smaller portion secured to the spindle 1 in any desired manner, a pin 14 being shown, and the diaphragm 15 at its smaller end carries a bearing bushing 16 for the spindle. It is evident that the bushing might be in the head 10 and the stuffing box 9 in the diaphragm 15. This cylinder is filled with oil and a second piston 17 in the larger portion of the cylinder has a stuffing box 18 to prevent leakage of oil around the spindle. Both pistons may be formed with circumferential packing grooves. The outer head of the cylinder has a central hub 19 and two flanges 20 and 22, and a pin 23 connected to the piston 17 extends through a hole in the flange 20 and is slidable therein and prevents the piston 17 from turning.

The piston 17 is secured to the externally threaded inner sleeve 24 which extends within the internally threaded outer sleeve 25. The spindle 1 has a key-way 26 in which is slidable a key 27 extending from the hub of the gear 28, and this gear is secured to the flange 29 on the outer end of the outer sleeve 25 which is rotatably mounted in the outer cylinder head.

The flange 22 is extended laterally as shown in Fig. 4 and to it is secured a frame 31, shown in Fig. 2, by means of bolts 32. This frame is formed with a bearing 33 for the spindle 1 and with bearings 34 for the stub shafts 35 on the worm gears 36. It is also formed with bearings 37 for the driving shaft 38 which carries the worms 39 which mesh with the worm gears 36. Pins 41 are mounted in the worm gears 36 and mesh with the teeth 42 of the gear 28 and these pins are also mounted in the disks 43 that rotate in the bearings 44 formed in the flange 22. The end thrust of the sleeve 25 and main gear 28 may be resisted by a thrust bearing consisting of rings 45 and balls 46. An eye 47 may be screwed onto the outer end of the spindle so that this device may be lifted thereby.

The operation of this device is as follows: After the flange has been secured to the flange of the valve shown in my former patent, the shaft 38 is turned to turn the worm gears 36 and the main gear 28 together with the sleeve 25, which causes the sleeve 24 and the piston 17 attached thereto to move toward the pipe being tapped. The space in the cylinder 12 between the pistons 17 and 13 having been previously filled with oil, the movement of the piston 17 causes a greater longitudinal movement of the piston 13 and of the spindle 1 and the tools connected thereto, the tools moving down through the opened valve until the drill 3 engages the pipe to which the valve has been attached. A hole is soon drilled and threaded by means of the threads 4 on the drill, after which a large hole is cut by the teeth of the cutter 2. After the opening has been cut, the shaft 38 is reversed and the spindle 1, cutter 2 and drill 3 with the cut out section of the pipe hanging thereon are withdrawn from the valve, after which that is closed. The threads 4 on the drill prevent the cut out section of pipe slipping off as would be the case if the drill were smooth.

The advantage of the two pistons 13 and 17 and the oil between them is that they relieve the cutter 2 of the absolute necessity of moving forward when an unusually hard spot in the metal being cut is reached, which movement is communicated to the piston 17 by the screw threaded sleeve 25. While liquids are generally considered incompressible, in practice there is so much air mixed with the liquid and so much free air in the cylinder 12 with the liquid that the spindle 1 may be permitted to turn without moving longitudinally, the result being a mere accumulation of pressure.

The ratio of diameters of the two parts of the cylinder 12 will determine the ratio of the movements of the pistons and may be varied as desired. So may also the other details of construction without departing from the spirit of my invention as set forth in the following claims.

I claim:—

1. A main tapping machine comprising a cylinder having parts of two diameters, a piston in each part of the cylinder, said cylinder being filled with liquid between the pistons, a spindle connected to one piston and slidable within the other, means to rotate the spindle and force one piston toward the other, and cutting tools mounted on one end of said spindle.

2. A main tapping machine comprising a cylinder having parts of two diameters, a piston in each part of the cylinder, said cylinder being filled with liquid between the pistons, a spindle connected to the piston of smaller diameter and slidable within the piston of larger diameter, means to rotate the spindle and to force the piston of larger diameter toward the other comprising a gear slidable on the spindle and rotatable therewith, an externally threaded sleeve secured to said larger piston, an internally threaded sleeve attached to said gear, and means to rotate the gear.

3. A main tapping machine comprising a cylinder having parts of two diameters and heads for said cylinder, a piston in each part of the cylinder, said cylinder being filled with liquid between the pistons, a spindle connected to the piston of smaller diameter and slidable within the other, the head at the smaller end of the cylinder being formed with a bearing bushing for said spindle, means to prevent the piston of larger diameter from rotating within the cylinder, an internally threaded sleeve journaled within the head at the larger end of the cylinder, an externally threaded sleeve screw threaded within the first and connected to the piston of larger diameter, and means to rotate said internally threaded sleeve to force the piston of larger diameter toward the other.

4. A main tapping machine comprising a cylinder having parts of two diameters and heads for said cylinder, a piston in each part of the cylinder, said cylinder being filled with liquid between the pistons, a spindle connected to the piston of smaller diameter and slidable within the other, the head at the smaller end of the cylinder being formed with a bearing bushing for said spindle, means to prevent the piston of larger diameter from rotating within the cylinder, an internally threaded sleeve journaled within the head at the larger end of the cylinder, an externally threaded sleeve screw threaded within the first and connected to the piston of larger diameter, and means to rotate said internally threaded sleeve to force the piston of larger diameter toward the other, comprising a main gear slidable on the spindle and rotatable therewith and attached to said internally threaded sleeve, a worm gear, a worm to drive the same, and pins mounted in said worm gear to engage the teeth of the main gear.

5. A main tapping machine comprising a cylinder having parts of two diameters and heads for said cylinder, a piston in each part of the cylinder, said cylinder being filled with liquid between the pistons, a spindle connected to the piston of smaller diameter and slidable within the other, the head at the smaller end of the cylinder being formed with a bearing bushing for said spindle, means to prevent the piston of larger diameter from rotating within the cylinder, an internally threaded sleeve journaled within the head at the larger end of the cylinder, an externally threaded sleeve screw threaded within the first and connected to the piston of larger diameter, means to rotate said internally threaded sleeve to force the piston of larger diameter toward the other, a spool attached to the small end of said cylinder and having a head provided with a stuffing box, a connector hub secured to said spool head, and cutting tools mounted on said spindle within said hub.

6. A main tapping machine comprising a cylinder having parts of two diameters and heads for said cylinder, a piston in each part of the cylinder, said cylinder being filled with liquid between the pistons, a spindle connected to the piston of smaller diameter and slidable within the other, the head at the smaller end of the cylinder being formed with a bearing bushing for said spindle, means to prevent the piston of larger diameter from rotating within the cylinder, an internally threaded sleeve journaled within the head at the larger end of the cylinder, an externally threaded sleeve screw threaded within the first and connected to the piston of larger diameter, means to rotate said internally threaded sleeve to force the piston of larger diameter toward the other, comprising a main gear attached to said internally threaded sleeve and slidable on the spindle and rotatable therewith, means mounted on the spindle to prevent endwise movement of said gear, a pair of worm gears and axles therefor parallel to the spindle, a shaft and a pair of worms mounted thereon in engagement with said worm gears, and pins mounted in said worm gears and adapted to engage the teeth of said main gear to drive the same .

JOHN W. FLOWER.